(12) United States Patent
Byrd et al.

(10) Patent No.: US 6,895,780 B1
(45) Date of Patent: May 24, 2005

(54) SORBER STRUCTURE FOR ELECTRO-DESORPTION COMPRESSOR

(75) Inventors: Charles M. Byrd, Rensselaer, NY (US); Dennis M. Pfister, San Luis Obispo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/611,190

(22) Filed: Jun. 30, 2003

(51) Int. Cl.[7] .......................... F25B 17/08; F25B 33/00
(52) U.S. Cl. .......................... 62/480; 62/497
(58) Field of Search .................... 62/480, 497; 165/81, 165/134.1

(56) References Cited

U.S. PATENT DOCUMENTS

| | | | | |
|---|---|---|---|---|
| 3,165,151 A | * | 1/1965 | Astrup et al. .................. | 165/81 |
| 3,493,724 A | * | 2/1970 | Wells .......................... | 392/435 |
| 3,526,274 A | * | 9/1970 | Gardner ....................... | 165/145 |
| 4,291,752 A | * | 9/1981 | Bridgnell ..................... | 165/81 |
| 4,425,980 A | * | 1/1984 | Miles .......................... | 181/208 |
| 4,581,049 A | * | 4/1986 | Januschkowetz ............. | 96/126 |
| 4,742,868 A | * | 5/1988 | Mitani et al. .......... | 165/104.12 |
| 5,388,637 A | * | 2/1995 | Jones et al. ............ | 165/104.12 |
| 6,041,617 A | * | 3/2000 | Sanada et al. ................ | 62/480 |
| 6,076,727 A | * | 6/2000 | Evans et al. ................. | 228/183 |
| 6,360,811 B1 | * | 3/2002 | Toh et al. ....................... | 165/75 |
| 6,502,419 B2 | * | 1/2003 | Pfister et al. ................. | 62/497 |

* cited by examiner

*Primary Examiner*—William C. Doerrler
(74) *Attorney, Agent, or Firm*—Gunnison, McKay & Hodgson, L.L.P.

(57) ABSTRACT

A sorber for an electro-desorption compressor comprises a first plate which includes a first outer surface and a first inner surface generally parallel to the first outer surface, a second plate which includes a second outer surface and a second inner surface generally parallel to the second outer surface, a device for securing the first plate to the second plate to thereby form an enclosure for a sorbent between the first and second inner surfaces, and at least one first support spar which is attached to the first outer surface and which is aligned in a first direction along the first plate. In this manner, the first support spar increases the resistance of the first plate to bending in the first direction.

4 Claims, 3 Drawing Sheets

SORBER STRUCTURE FOR ELECTRO-DESORPTION COMPRESSOR

BACKGROUND OF THE INVENTION

The present invention is directed to a sorber for an electro-desorption compressor. More particularly, the invention is directed to a sorber which comprises a number of support spars to bolster the mechanical strength of the sorber.

In existing electro-desorption compression systems, a first, typically gaseous substance called a sorbate is alternately adsorbed onto and desorbed from a second, typically solid substance called a sorbent. During the adsorption reaction, the sorbate is drawn onto and combines with the sorbent to form a sorbate/sorbent compound. During the desorption reaction, energy in the form of an electrical current is conducted to the sorbate/sorbent compound to break the bonds between the sorbate and sorbent molecules and thereby desorb the sorbate from the sorbent. In this reaction, the sorbate is driven off of the sorbent and into a relatively high pressure, high energy state.

The adsorption and desorption reactions take place in a reactor vessel which will be referred to herein as a sorber. In addition to forming an enclosure for the sorbent, the sorber facilitates the transfer of electrical energy to the sorbate/sorbent compound during the desorption reactions. In order to facilitate the transfer of electrical energy to the sorbate/sorbent compound, the sorber usually includes a pair of spaced-apart electrical conductors between which the sorbent is positioned. Thus, during the desorption reaction, an electrical current from a power supply is conveyed to the conductors and through the sorbate/sorbent compound to desorb the sorbate from the sorbent.

The rate of each adsorption reaction is related to the temperature of the sorbent. Thus, the lower the temperature of the sorbent, the quicker the sorbate will be adsorbed. However, during each adsorption reaction the kinetic energy of the sorbate molecules is converted to heat as the sorbate molecules combine with the sorbent molecules. This heat, which is often called the heat of adsorption, is conducted to the sorbent and can raise the temperature of the sorbent by a significant amount. The heat of adsorption should therefore be removed from the sorbent prior to each subsequent adsorption reaction to minimize the adsorption reaction rate and thereby improve the efficiency of the sorption compression system.

Thus, the sorber should function not only to communicate the electrical current to the sorbent during the desorption reaction, but also to remove the heat of adsorption to the outside environment. Consequently, the sorber should ideally made from a material having a high thermal conductivity, such as an aluminum alloy. However, metals which are good thermal conductors tend to have relatively low mechanical strengths. In one prior art sorber design, the electrical conductors comprise a pair of relatively flat plates which are secured together at their periphery, and the sorbent is in the form of a thin, flat monolith which is positioned between the conductor plates. Thus, in order to withstand the pressures which are generated during the desorption reaction, which can approach 250 psi with some sorbent and sorbate materials, the conductor plates would have to be made exceedingly thick. Moreover, the thicker the conductor plates, the longer the time required to dissipate the heat of adsorption to the outside environment.

SUMMARY OF THE INVENTION

In accordance with the present invention, these and other limitations in the prior art are addressed by providing a sorber for an electro-desorption compressor in which a sorbate is alternately adsorbed onto and desorbed from a sorbent. The sorber comprises a first plate which includes a first outer surface and a first inner surface that is generally parallel to the first outer surface, a second plate which includes a second outer surface and a second inner surface that is generally parallel to the second outer surface, and means for securing the first plate to the second plate to thereby form an enclosure for the sorbent between the first and second inner surface. The sorber also comprises at least one first support spar which is attached to the first outer surface and which is aligned in a first direction parallel to the first plate. In this manner, the first support spar increases the resistance of the first plate to bending in the first direction. Therefore, the first plate can be made suitably thin to readily dissipate the heat of adsorption, but sufficiently strong to withstand the pressures which are generated during the desorption reactions.

In one embodiment of the invention, the sorber also comprises at least one second support spar which is attached to the first outer surface and which is aligned in a second direction parallel to the first plate. In this manner, the second support spar increases the resistance of the first plate to bending in the second direction. Therefore, the first and second support spars function to increase the mechanical strength of the first plate in the first and second directions while allowing the first plate to remain suitably thin.

In yet another embodiment of the invention, the first and second support spars define four quadrants on the first outer surface. In addition, the sorber also comprises at least one fan which is positioned at least partially within one of the quadrants. Thus, the fan will assist in dissipating the heat of adsorption from the first plate.

These and other objects and advantages of the present invention will be made apparent from the following detailed description, with reference to the accompanying drawings. In the drawings, the same reference numbers are used to denote similar elements in the various embodiments.

DETAILED DESCRIPTION OF THE PREFERRED EMBODIMENTS

Figure 1:
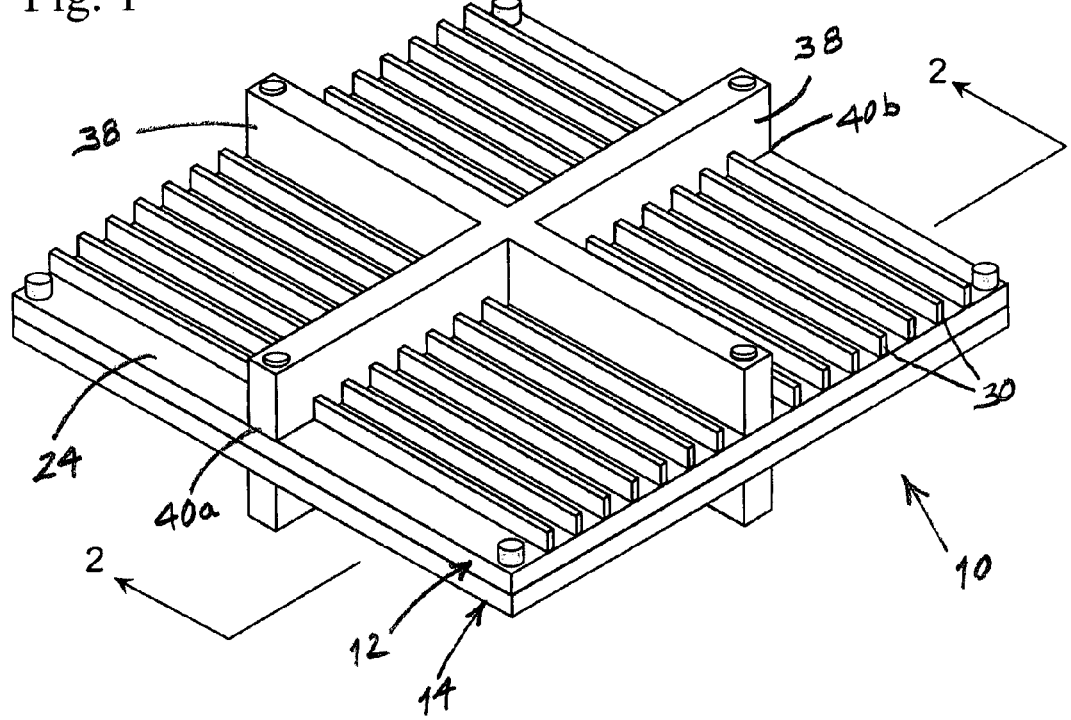
FIG. 1 is a perspective view of a sorber according to the present invention.
Figure 2:
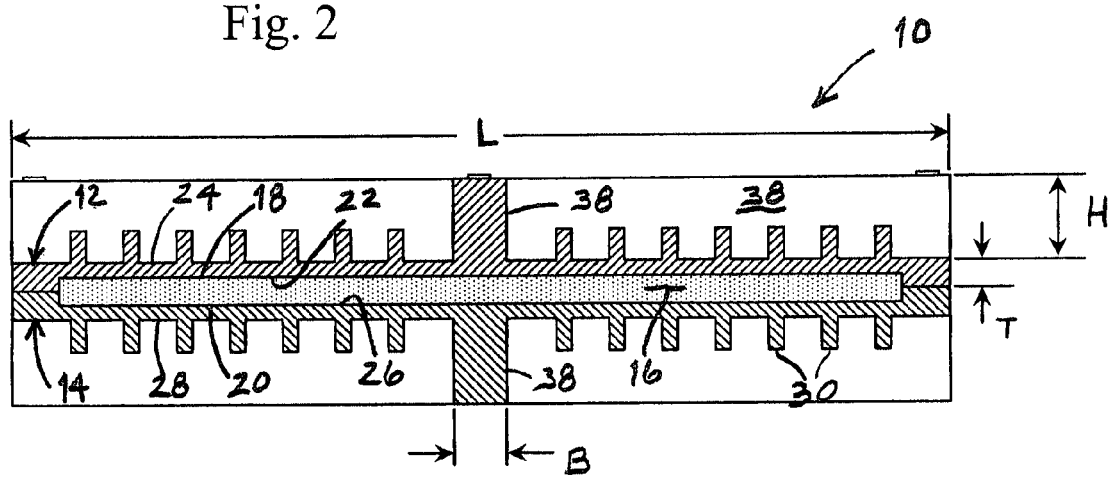
FIG. 2 is a cross sectional view of the sorber taken along line 2—2 of FIG. 1.
Figure 3:
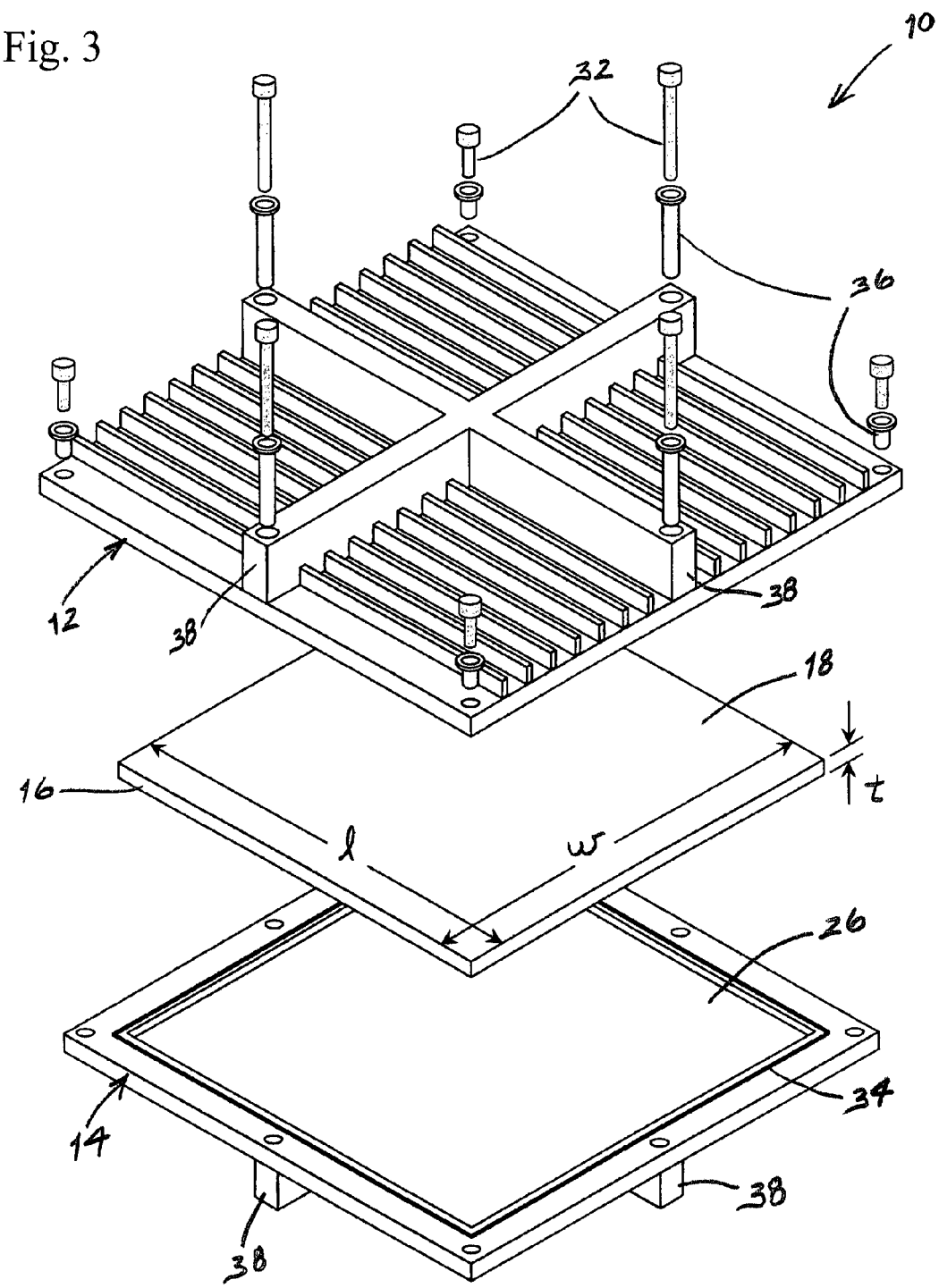
FIG. 3 is an exploded view of the sorber shown in FIG. 1.

Referring to FIGS. 1–3, the sorber of the present invention, which is indicated generally by reference number 10, is shown to comprise a top plate 12 which is secured to a bottom plate 14 to form an enclosure for a sorbent 16. The sorber 10 is designed for use in an electro-desorption compressor in which a sorbent is alternately adsorbed onto and desorbed from the sorbent 16. In such a compressor, the desorption reaction is driven by an electrical current which is conducted across the sorbent. During each desorption reaction, substantial pressures are created in the sorber 10 as the sorbate is driven off of the sorbent 16. In addition, during each adsorption reaction substantial heat of adsorption is generated in the sorbent 16 as the sorbate combines with the sorbent. Therefore, the top and bottom plates 12, 14 are ideally made from a material which is both strong and has a relatively high thermal conductivity, such as an aluminum alloy.

As shown in FIGS. 2 and 3, the sorbent 16 is a monolithic member having a thickness "t" and generally parallel top and bottom surfaces 18 and 20, respectively, each of which has a length "l" and a width "w". Although the surfaces 18, 20 are depicted as being rectangular, they could have any practical shape. In order to minimize the thermal diffusion path length through the sorbent 16, and thus maximize the rate at which the heat of adsorption is dissipated from the sorbent, the thickness "t" should be kept as small as possible. In the event the heat of adsorption is dissipated through both the top and bottom surfaces 18, 20, the thickness "t" is preferably less than the smallest linear dimension of the top or bottom surface, which, for example, is the length of the minor side of a rectangle, the length of any side of a square, or the length of the diameter of a circle. If the heat of adsorption is dissipated through only one of the top and bottom surfaces 18, 20, the thickness "t" is preferably less than one-half the smallest linear dimension of the top or bottom surface. More preferably, the thickness "t" is less than one-tenth the smallest linear dimension of the top or bottom surface. By sizing the sorbent accordingly, the minimum thermal diffusion path will be transverse to the top and bottom surfaces 18, 20, and the heat of adsorption will consequently be readily dissipated through either or both of these surfaces.

The sorber 10 is designed to facilitate the transfer of the heat of adsorption from the sorbent 16 to the outside environment. Thus, the top plate 12 comprises an inner surface 22 which is preferably adapted to engage substantially the entire top surface 18 of the sorbent 16, and an outer surface 24 which is generally parallel to the inner surface and is exposed to the outside environment. Similarly, the bottom plate 14 comprises an inner surface 26 which is ideally adapted to engage substantially the entire bottom surface 20 of the sorbent 16, and an outer surface 28 which is generally parallel to the inner surface and is exposed to the outside environment. Thus, the heat of adsorption will be conducted from the sorbent 16 to the inner surfaces 22, 26 and through the top and bottom plates 12, 14 to the outer surfaces 24, 28. Accordingly, each of the top and bottom plates 12, 14 comprises a thickness T which is optimally minimized to reduce the thermal diffusion path length through the sorber 10. In addition, either or both of the top and bottom plates 12, 14 may comprise a plurality of cooling fins 30 to help dissipate the heat of adsorption from the outer surfaces 24, 28 to the outside environment.

As described more fully in U.S. Pat. No. 6,502,419, which is commonly owned herewith and is hereby incorporated herein by reference, the sorber 10 is the reactor vessel in which the adsorption and desorption reactions take place. Thus, the sorber 10 must form a sealed enclosure for and facilitate the communication of electrical energy to the sorbent 16. Accordingly, the top and bottom plates 12, 14 are secured together along their peripheral edges by suitable means, such as a plurality of high strength steel bolts 32. In addition, the sorber 10 may include an appropriate sealing element, such as a non-metallic O-ring type seal 34, to provide a pressure-tight seal between the top and bottom plates 12, 14. Moreover, although not shown in the drawings, the sorber 10 also includes a number of fluid ports to facilitate the communication of the sorbate to and from the sorbent 16 during the adsorption and desorption reactions, respectively.

The electrical energy required to effect the desorption of the sorbate from the sorbent 16 commonly takes the form of an electrical current. This electrical current is communicated to the sorbent 16 by pair of electrical conductors that are positioned on opposite sides of the sorbent. In the embodiment of the sorber 10 shown in the Figures, the top and bottom plates 12, 14 comprise the electrical conductors through which the electrical current is conveyed to the sorbent 16. Thus, the top and bottom plates 12, 14 are made of a suitable electrically conductive material, such as an aluminum alloy, and are connected to a power supply over corresponding leads (not shown). In addition, the top and bottom plates are electrically isolated from each other by an appropriate insulator. This insulator may comprise a gasket which is made of a suitable non-conducting, chemically inert and heat resistant material, such as synthetic rubber, or may be formed by treating the adjacent portions of the top and bottom plates 12, 14, such as by anodizing, to make them non-conducting. Furthermore, an insulating grommet 36 is ideally positioned between each bolt 32 and the top plate 12 to insulate the bolt, and thus the bottom plate 14, from the top plate.

As mentioned above, the thickness "T" of each of the top and bottom plates 12, 14 is preferably minimized in order to reduce the thermal conduction path length through the sorber 10 and thereby increase the rate at which the heat of adsorption is dissipated from the sorbent 16. However, during the desorption reaction substantial pressures are generated in the sorber 10 as the sorbate is driven off of the sorbent 16. Therefore, the sorber 10 must be sufficiently strong to withstand these pressures without failing.

In accordance with the present invention, therefore, the sorber 10 comprises a number of ribs or support spars 38 to bolster the mechanical strength of either or both of the top and bottom plates 12, 14 and thus allow the thickness of the top and bottom plates to be kept at a minimum. As shown in FIGS. 1–3, each support spar 38 comprises an elongated beam which extends substantially between two points 40a, 40b on the outer peripheral edge of the top or bottom plate 12, 14 to which the spar is connected. In addition, although each support spar 38 is shown to have a rectangular cross section, it may comprise any structurally advantageous cross section, including a rounded rectangular, T-shaped or I-shaped cross section. Furthermore, each support spar 38 may comprise either the same or a different material as the top and bottom plates 12, 14. For example, the advantages of the support spars 38 may be more fully realized by constructing the support spars from a higher strength material than that of the top or bottom plate, such as a high strength steel.

Each support spar 38 may be attached to the outer surface 24, 28 of the corresponding top or bottom plate 12, 14 using any suitable mechanical or metallurgical technique. For example, each support spar 38 may be welded or brazed to the top or bottom plate. In this case, care should be taken to maintain or restore any existing temper in the material of the top or bottom plate. This may be accomplished by adjusting the brazing process to solution harden the material of the top or bottom plate during the brazing process itself. Each spar 38 may alternatively be formed integrally with the top or bottom plate 12, 14 in a single casting or machining operation.

The number, spacing and orientation of the support spars 38 on the top and bottom plates 12, 14 depend in large part on the shape of the top and bottom plates. The support spars 38 are ideally employed to strengthen the areas of the top and bottom plates which are subject to the maximum forces created by the pressure that is generated in the sorber 10 during each desorption reaction. Since the top and bottom plates 12, 14 are secured together adjacent their peripheral edges, the maximum forces which will act on the plates will be in the form of bending moments, and these bending moments will be greatest near the center of the plates. Thus, sufficient support spars 38 should be used, and these support spars should be spaced and oriented, to ensure that the center portions of the top and bottom plates 12, 14 are adequately supported against the maximum bending moments.

For example, when the top and bottom plates 12, 14 are substantially square, as shown in FIGS. 1–3, two support spars 38 may be attached to each of the top and bottom plates 12, 14, and the two support spars of each plate may be oriented to intersect at an angle of approximately 90° in about the center of the plate. However, other numbers and configurations of support spars may also be suitable to achieve the desired objectives of the invention. Thus, the center portion of each of the top and bottom plates 12, 14 may be adequately supported with a single support spar 38, or with two parallel or otherwise non-intersecting support spars.

The support spars 38 effectively enlarge the moment of inertia of the plates 12, 14 and thereby increase the resistance of the plates to bending during each desorption reaction. In this context, the strength of a plate can be related to its moment of inertia by the following equation:

$$\sigma = Mc/I, \quad (1)$$

where $\sigma$ is the maximum bending stress that the plate is designed to withstand, M is the bending moment acting on the plate, c is the distance from the neutral axis of the plate to the outer surface of the plate, and I is the moment of inertia of the plate. Thus, by increasing the moment of inertial of the plate, the maximum bending moment that the plate will be able to bear before reaching its maximum bending stress will likewise increase.

For purposes of the present discussion, the cross section of each of the top and bottom plates 12, 14 and the support spar 38 can be considered to be a simple rectangle. The moment of inertia for a rectangle is given by the following equation:

$$I = bh^3/12, \quad (2)$$

where b is the width of the rectangle and h is the height of the rectangle. Furthermore, since the centroidal axis of the combined plate and support spar is offset from the centroidal axes of the plate and the support spar, the moment of inertia of the combined plate and support spar will be much greater than that of either the plate or the support spar alone, as will be made apparent from the following example.

In an exemplary embodiment of the sorber 10, each of the top and bottom plates 12, 14 is 3.5 inches square and has a thickness T of 0.2 inch. In addition, each support spar 38 is a rectangular beam having a width B of 0.2 inch and a height H of 0.5 inch. Assuming that the cross section of each plate is a simple rectangle, the moment of inertia of the plate alone is $=0.0023$ in$^4$. Similarly, the moment of inertia of the spar alone is $0.0020$ in$^4$. However, the moment of inertia of the combined plate and spar about its own centroidal axis is $0.0150$ in$^4$. Therefore, it may be seen that the moment of inertial of the combined plate and spar is substantially greater than that of either the plate or the spar alone.

Furthermore, where either the top or bottom plate 12, 14 is provided with two support spars 38 that are aligned in different directions, the support spars will augment the moments of inertia of the plate in both of these directions, thereby greatly increasing the overall strength of the plate. For example, in the embodiment of the invention shown in FIGS. 1–3, one support spar is aligned in a first direction and a second support spar is aligned in a second direction which is generally perpendicular to the first direction. Therefore, the first support spar increases the resistance of the plate to bending in the first direction and the second support spar increases the resistance of the plate to bending in the second direction.

Figure 4:
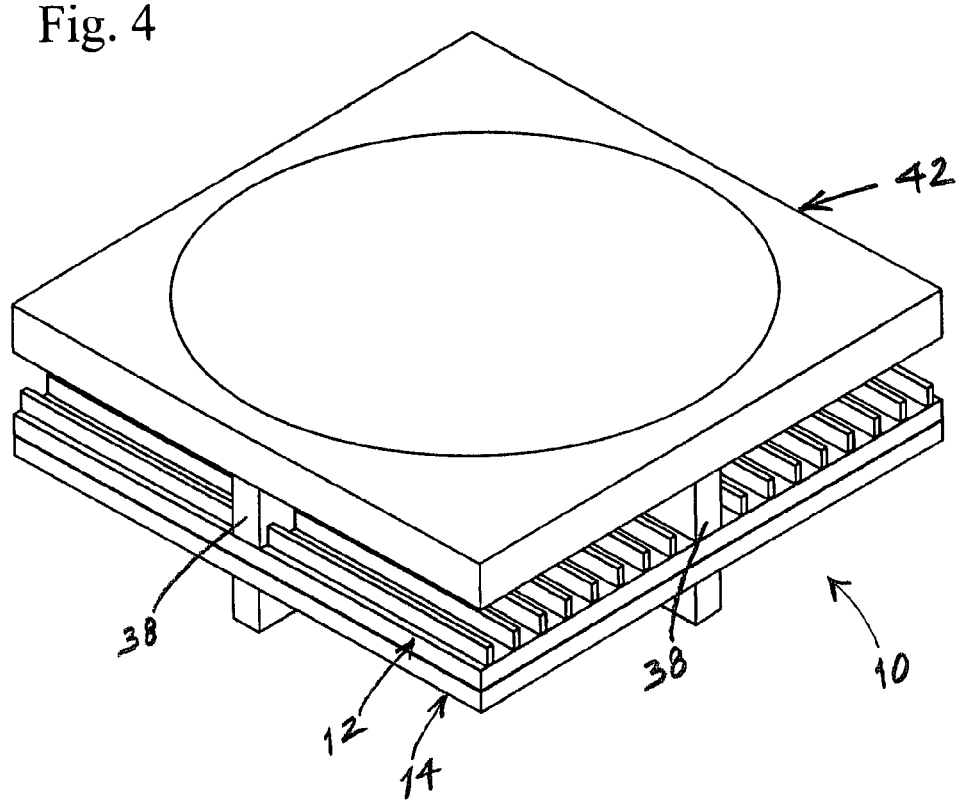
FIG. 4 is a perspective view of another embodiment of a sorber according to the present invention.
Figure 5:
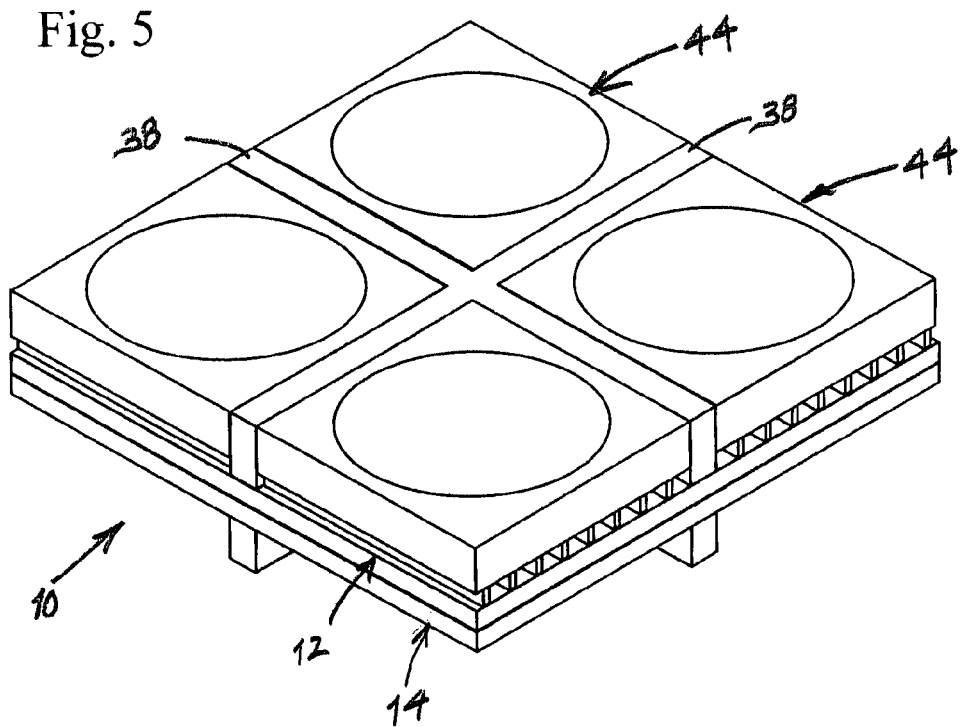
FIG. 5 is a perspective view of yet another embodiment of a sorber according to the present invention.

In addition to increasing the mechanical strength of the top and bottom plates 12, 14, the support spars 38 may also be used to mount auxiliary equipment to the sorber 10. Referring to FIG. 4, the sorber 10 is shown to include a cooling fan 42 which is mounted to the support spars 38 of the top plate 12. The cooling fan 42 is ideally sized to extend over substantially the entire top plate 12 and is attached to the top plate by any suitable means, such as a number of screws (not shown). In this manner, the cooling fan 42 will aid in circulating ambient air over the cooling fins 30.

Where space is limited, however, the cooling fan or fans may be mounted between the support spars 38. Referring to FIG. 5, it may be seen that the support spars 38 of the top plate 12 divide the outer surface 24 of the top plate into four generally equal quadrants. In addition, a relatively small cooling fan 44 is positioned between the support spars 38 in each quadrant. Consequently, the cooling fans 44 do not extend substantially above the top of the support spars.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A sorber for an electro-desorption compressor in which a sorbate is alternately adsorbed onto and desorbed from a sorbent, the sorber comprising:
   a first plate which includes a first outer surface and a first inner surface that is generally parallel to the second outer surface;
   means for securing the first plate to the second plate to thereby form an enclosure for the sorbent between the first and second inner surfaces;
   at least on first support spar which is attached to the first outer surface and which is aligned in a first direction along the first plate, wherein the first support spar increases the resistance of the first plate bending in the first direction; and
   at least one fan which is mounted to the first support spar.

2. A sorber for an electro-desorption compressor in which a sorbate is alternately adsorbed onto and desorbed from a sorbent, the sorber comprising:
   a first plate which includes a first outer surface and a first inner surface that is generally parallel to the second outer surface;

means for securing the first plate to the second plate to thereby form an enclosure for the sorbent between the first and second inner surfaces;

at least on first support spar which is attached to the first outer surface and which is aligned in a first direction along the first plate, wherein the first support spar increases the resistance of the first plate bending in the first direction;

at least one second support spar which is attached to the first outer surface and which is aligned in a second direction along the first plate; wherein the second support spar increases the resistance of the first plat bending in the second direction;

wherein the first direction is approximately perpendicular to the second direction;

further wherein the first and second support spars define four quadrants on the first outer surface and the sorber further comprises at least one fan which is positioned at least partially in one of the quadrants.

3. A sorber for an electro-desorption compressor in which a sorbate is alternately adsorbed onto and desorbed from a sorbent, the sorber comprising:

a generally flat first plate;

a generally flat second plate which is secured to the first plate from an enclosure for the sorbent; and at least one support spar which is attached to the first plate;

wherein the support spar increases the resistance of the first plate to bending; and at least one fan which is mounted to the support spar.

4. A sorber for an electro-desorption compressor in which a sorbate is alternately adsorbed onto and desorbed from a sorbent, the sorber comprising:

a generally flat first plate;

a generally flat second plate which is secured to the first plate from an enclosure for the sorbent; and at least one support spar which is attached to the first plate;

wherein the support spar increases the resistance of the first plate to bending; and wherein the at least one support spar comprises a first support spar which is attached to the first plate in a first direction and a second support spar which is attached to the first plate in a second direction;

further wherein the first direction is approximately perpendicular to the second direction;

further wherein the first and second support spars define four quadrants on the first plate and the sorber further comprises at least one fan which is positioned at least partially in one of the quadrants.

* * * * *